United States Patent
Ono et al.

[11] Patent Number: 5,883,741
[45] Date of Patent: Mar. 16, 1999

[54] OPTICAL HEAD DEVICE AND BIREFRINGENT DIFFRACTION GRATING POLARIZER AND POLARIZING HOLOGRAM ELEMENT USED THEREIN

[75] Inventors: Yuzo Ono; Akitomo Oba, both of Tokyo, Japan

[73] Assignee: NEC Corporation, Tokyo, Japan

[21] Appl. No.: 808,957

[22] Filed: Feb. 19, 1997

Related U.S. Application Data

[60] Continuation of Ser. No. 383,845, Feb. 6, 1995, abandoned, which is a division of Ser. No. 197,187, Feb. 16, 1994, Pat. No. 5,535,055.

[30] Foreign Application Priority Data

Feb. 16, 1993 [JP] Japan .................................. 5-026376
Feb. 24, 1993 [JP] Japan .................................. 5-033862

[51] Int. Cl.$^6$ ........................................... G02B 5/30
[52] U.S. Cl. ............................. 359/495; 359/566; 359/7; 369/112
[58] Field of Search ....................... 359/566, 558, 359/495, 494, 7; 369/111, 112, 44.14, 44.23

[56] References Cited

U.S. PATENT DOCUMENTS

| | | | |
|---|---|---|---|
| 4,846,552 | 7/1989 | Veldkamp et al. | 359/572 |
| 4,885,734 | 12/1989 | Yuzo | 369/44.23 |
| 4,937,808 | 6/1990 | Shimada et al. | 369/112 |
| 4,945,529 | 7/1990 | Ono et al. | 369/44.11 |
| 4,991,937 | 2/1991 | Urino | 359/566 |
| 5,029,988 | 7/1991 | Urino | 359/494 |
| 5,245,471 | 9/1993 | Iwatsuka et al. | 359/494 |
| 5,301,182 | 4/1994 | Komma et al. | 369/44.12 |
| 5,367,403 | 11/1994 | Yamamoto et al. | 359/495 |
| 5,377,177 | 12/1994 | Horinouchi et al. | 369/112 |
| 5,404,344 | 4/1995 | Imada et al. | 369/112 |
| 5,422,870 | 6/1995 | Kojima et al. | 369/112 |
| 5,446,719 | 8/1995 | Yoshida et al. | 369/44.12 |
| 5,453,963 | 9/1995 | Katayama et al. | 369/44.23 |
| 5,493,555 | 2/1996 | Kimura et al. | 369/109 |

FOREIGN PATENT DOCUMENTS

| | | |
|---|---|---|
| 63-314502 | 12/1988 | Japan . |
| 3-29129 | 2/1991 | Japan . |
| 3-29137 | 2/1991 | Japan . |
| 3-125340 | 5/1991 | Japan . |

OTHER PUBLICATIONS

E.G. Loewen, et al., "Grating Efficiency Theory as it Applies to Blazed and Holographic Gratings", Applied Optics, vol. 16, No. 10, pp. 2711–2721.

Primary Examiner—Cassandra Spyrou
Assistant Examiner—John Juba, Jr.
Attorney, Agent, or Firm—Sughrue, Mion, Zinn, MacPeak & Seas, PLLC

[57] ABSTRACT

An optical head device uses a birefringent diffraction grating polarizer configured in a reflection type. The device includes a polarizing hologram element which reflects the light from a light source to a converging lens system and diffracts the polarized light returning from a recording medium. A total reflection film is formed on a surface of a diffraction grating which is provided periodically by an ion exchange region and a dielectric film on a surface of a crystal plate having optically anisotropic characteristics. A polarizing beam splitter film formed on a surface of the polarizing hologram element has reflectivity and transmissivity having dependency on the polarization of the incident light. In another form, a polarizing hologram element includes a polarizing hologram which has diffractive efficiency having dependency on polarization of incident light and a polarizing beam splitter film which has reflectivity and transmissivity having dependency on the polarization of the incident light. The diffracted light is received by multi-split photodetectors. The arrangements enable to make the optical head device compact, light in weight and low cost.

11 Claims, 11 Drawing Sheets

OPTICAL HEAD DEVICE AND BIREFRINGENT DIFFRACTION GRATING POLARIZER AND POLARIZING HOLOGRAM ELEMENT USED THEREIN

This is a continuation of application Ser. No. 08/383,845 filed Feb. 6, 1995, now abandoned which is a divisional of application Ser. No. 08/197,187 filed Feb. 16, 1994 (now U.S. Pat. No. 5,535,055).

BACKGROUND OF THE INVENTION

(1) Field of the Invention

The present invention relates to an optical head device, and more particularly to a birefringent diffraction grating polarizer, a polarizing hologram element and a optical head device using such polarizer or hologram element.

(2) Description of the Related Art

The polarizer, especially, the polarizing beam splitter is an element with which a predetermined polarized light beam is obtained by causing the light propagation directions changed, in the polarized beams, to be orthogonal to each other. Conventional examples of the polarizing beam splitters often used include a Glan-Thompson prism or a Rochon prism. In one example, the optical path is separated by utilization of differences in the transmission or reflection due to the polarization at cemented surfaces of crystal compounds having large birefringences. In another example, a dielectric multi-layer film is provided at the cemented surface of a compound prism type beam splitter and, by utilization of differences in the interference in the dielectric multi-layer film due to the polarization, the light is caused to be reflected or transmitted. The drawbacks in such elements are that the size thereof is large, the productivity thereof is low, and the cost thereof is high. Also, the polarizer of a bulk type as above only has polarizing functions so that, when it is used for an optical disk head device, there are difficulties in compositely accommodating other functions such as those for focusing error detection and tracking error detection, and these are obstacles to the scaling down of the optical head device.

Figure 1:
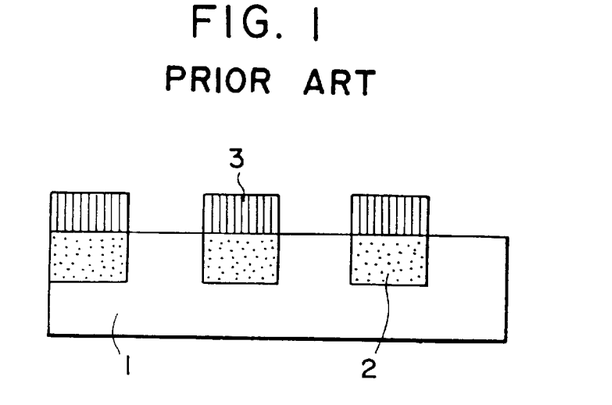
FIG. 1 is a diagrammatic sectional view of a conventional hologram element.

A recently developed polarizer in which the productivity is high and the composite functions other than the polarization function are accommodated is a birefringent diffraction grating polarizer which is disclosed in Japanese Patent Application Kokai Publication No. 63-314502. FIG. 1 is a sectional view showing such birefringent diffraction grating polarizer. Where a proton exchange region of benzoic acid is provided on an X-plate or a Y-plate of a lithium niobate substrate 1 which is a birefringent crystal, it is noted that, with respect to a wavelength of, for example, 0.78 μm which is generally used in the optical disk device, the index of refraction for ordinary light which is polarized parallel to the crystal optical axis of the substrate increases by about 0.12 and the index of refraction for ordinary light which is polarized perpendicular to the optical axis decreases by about 0.04. Thus, the grating in which the exchange region 2 with the proton and the non-exchange region without the proton are arranged periodically functions as a diffraction grating. When this grating is configured such that a phase compensation film 3 of an appropriate thickness is formed on the exchange region 2 for mutually canceling the phase difference between the ordinary light passing through the exchange region 2 and the ordinary light passing through the non-exchange region, the grating does not function as a diffraction grating with respect to the ordinary light, whereby such ordinary light is allowed to be transmitted without being diffracted. That is, this grating is seen simply as a transparent plate. Where the phase difference with respect to the extraordinary light is π when the depth of the exchange region 2 is changed while maintaining the mutual phase difference cancellation conditions with respect to the ordinary light and, moreover, the width of the proton exchange region 2 and that of the non-exchange region are the same with each other, the extraordinary light is completely diffracted. The relationship of these phases may be expressed by the following equations:

$$\{\Delta n_e \cdot T_p + (n_d - n_{out}) \cdot T_d\} \cdot 2\pi/\lambda = \lambda$$

$$\{\Delta n_o \cdot T_p + (n_d - n_{out}) \cdot T_d\} \cdot 2\pi/\lambda = 0$$

wherein $n_d$ and $T_d$ are respectively an index of refraction and a thickness of the phase compensation film 3, $T_p$ is a depth of the proton exchange region 2, $\Delta n_e$ and $\Delta n_o$ are amounts of changes in the index of refraction in the extraordinary light and the ordinary light at the proton exchange region 2, and $n_{out}$ is an index of refraction outside the hologram substrate, that is, $n_{out}=1$ in an air layer. Also, $\lambda$ is a wavelength of light.

Also, it is possible to realize the polarization function by the arrangement wherein the proton exchange region 2 and the phase compensation film 3 are disposed alternately, the phase difference between the light passing through the proton exchange region 2 and the light passing through the phase compensation film 3 of dielectric is made zero with respect to the extraordinary light, the phase difference therebetween is made π with respect to the ordinary light, and the width of the proton exchange region 2 and that of the phase compensation film 3 are made the same with each other. In this case, the extraordinary light is transmitted without being diffracted and the ordinary light is completely diffracted.

Figure 2:
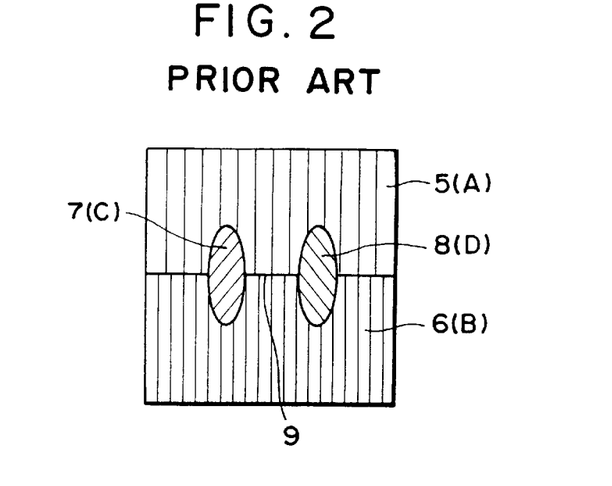
FIG. 2 is a diagram showing a grating pattern in a conventional hologram element.
Figure 3:
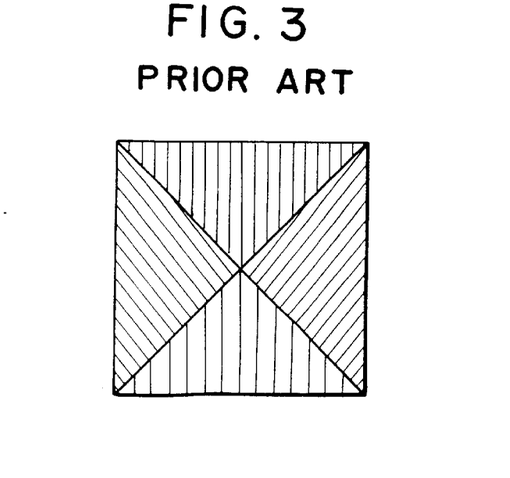
FIG. 3 is a diagram showing another grating pattern in the conventional hologram element.

The disclosure of examples in which the above birefringent diffraction grating polarizer is used in the optical head device is found in Japanese Patent Application Kokai Publication No. 3-29137 and Japanese Patent Application Kokai Publication No. 3-29129 which respectively disclose hologram elements. While these hologram elements are configured as shown in a sectional view in FIG. 1, the grating patterns are constituted by a plurality of grating regions having different diffraction directions as shown in FIG. 2 for purposes of detecting focusing error signals and tracking error signals in the optical head. In similarly arranged grating patterns, the grating regions are constituted by divided patterns as shown in FIG. 3.

Figure 4:
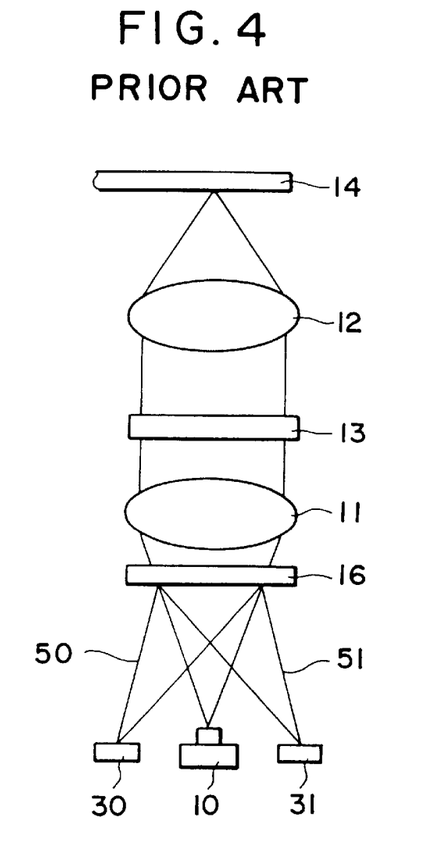
FIG. 4 is a diagram showing arrangements of a conventional optical head device.

FIG. 4 diagrammatically shows an optical head device for use in a video disk, a write once read many type optical disk and a rewritable type phase-change optical disk as disclosed in Japanese Patent Application Kokai Publication No. 3-29129. The light emitted from a semiconductor laser 10 is incident on a hologram element 16 as ordinary light, transmitted without being diffracted, passes through a collimating lens 11, a ¼ wavelength plate 13 and an objective lens 12, and is converged on an optical disk 14. The returning light from the optical disk 14 is incident again on the hologram element 16 after passing through the common path in reverse. The polarizing surface of the returning light is rotated 90 degrees with respect to that of the original polarized light by the ¼ wavelength plate 13 so that such light is incident on the hologram element 16 as extraordinary light and is completely diffracted, and the +1 order diffracted light 50 and the −1 order diffracted light 51 are received respectively by a first photodetector 30 and a second photodetector 31.

Figure 5:
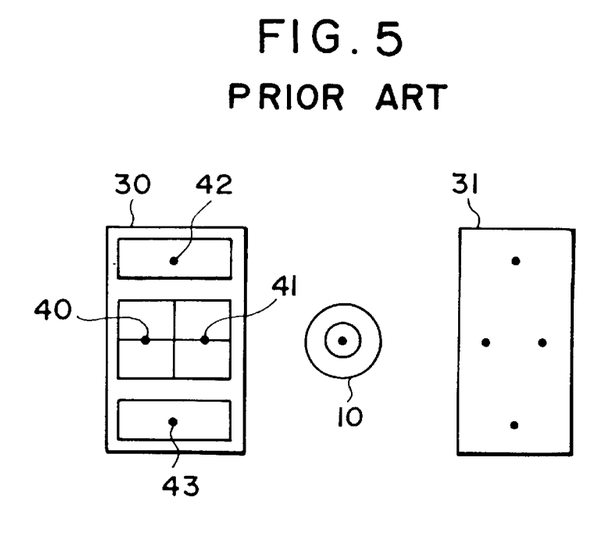
FIG. 5 is diagram showing a state of diffracted light beams incident on respective photodetectors in a conventional arrangement.

FIG. 5 shows in a plane view the first photodetector 30 and the second photodetector 31 with the semiconductor laser disposed between them and shows a state of the diffracted light beams incident respectively on the photodetectors. The diffracted light beams from a region 5(A) and the diffracted light beams from a region 6(B) in the hologram (shown in FIG. 2) converge respectively at a converging point 40 and a converging point 41 shown in FIG. 5. A dividing line 9 on the hologram pattern in FIG. 2 functions as a knife edge and, by a double-knife-edge method, a focusing error signal is detected from these diffracted light beams. A tracking error is detected by a push-pull method based on the difference between the diffracted light beams from the region 7(C) and the diffracted light beams from the region 8(B) which converge respectively at the points 42 and 43 shown in FIG. 5. A recording signal is detected based on the light received from the second photodetector 31 or on the sum of the amounts of light received from both the first photodetector 30 and the second photodetector 31. Also, by arranging to receive higher order diffracted beams, it is possible to have the intensity of the signal further increased.

Figure 6:
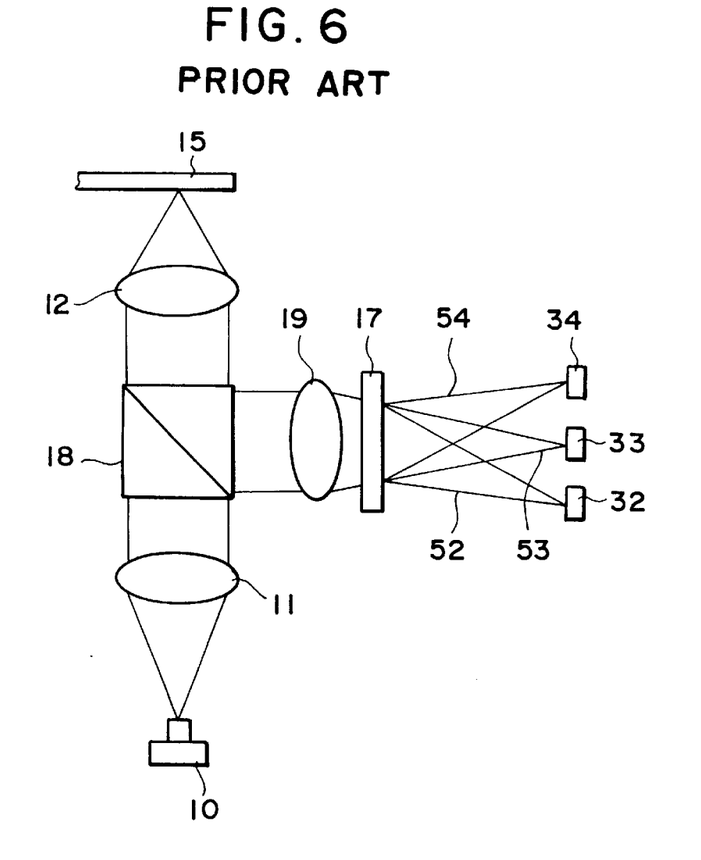
FIG. 6 is diagram showing arrangements of a conventional optical head device.
Figure 7:
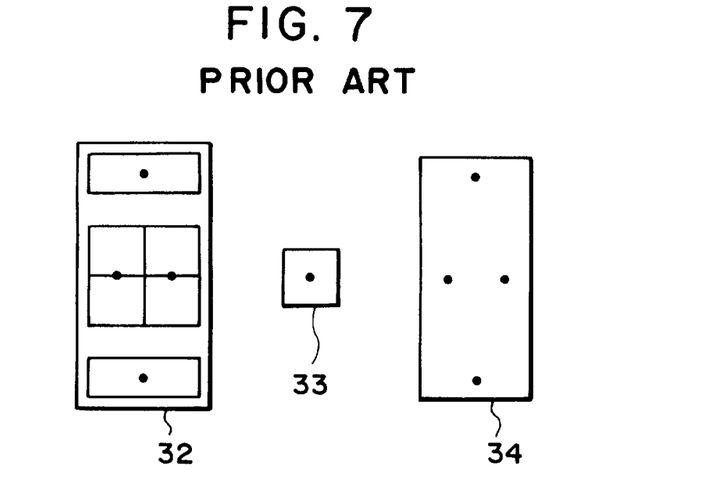
FIG. 7 is a diagram showing a state of diffracted light beams incident on respective photodetectors in a conventional arrangement.

FIG. 6 shows an optical head device for a magneto-optical disk as disclosed in Japanese Patent Application Kokai Publication No. 3-29137. The light emitted from a semiconductor laser 10 passes through a collimating lens 11, a polarizing beam splitter 18 and an objective lens 12 and then is converged on a magneto-optical disk 15. Following a reverse path, the returning light from the magneto-optical disk 15 is separated to outside an optical axis by the polarizing beam splitter 18, is caused to be converged by a lens 19, whereby the extraordinary light component is diffracted by a hologram element 17, and is received by a first photodetector 32, a second photodetector 33 and a third photodetector 34. The polarizing beam splitter 18 has polarization characteristics which cause the p-polarized light from the semiconductor laser 10 to be partially reflected and residually transmitted and also cause the s-polarized light orthogonal thereto, that is, slight amounts of polarized light occurring by Kerr effect at the reflection on the magneto-optical disk 15, to be completely reflected. The recording signal is detected by a differential detection method from the 0 order diffracted light and the +1 order diffracted light separated by polarization due to the polarizing function of the hologram element 17. Where the detection relies on the difference between the sum of +1 order diffracted light 52 and −1 order diffracted light 54 and the 0 order diffracted light 53, the amounts of light become balanced and the recording signal can be detected with small noise when the direction of the returning light is at an angle of 42 degrees with respect to the crystal optical axis of the hologram element. When the detection relies on the difference between the −1 order diffraction light 54 and the 0 order diffracted light 53, the angle may be set to about 32 degrees. FIG. 7 is a diagram for illustrating a state of the diffracted light beams where they are incident on the photodetectors. Focusing and tracking error signals are detected in the same way as in the case of FIG. 5 by using the +1 order diffracted light 52 which is incident on the first photodetector 32.

The above described birefringent diffraction grating polarizer is a light transmission type so that the process of forming a grating layer requires a long time because it is necessary to make the proton exchange region deep and also it is necessary to make the phase compensation film thick. Also, if this element is used in the conventional optical head device described above, it will be difficult to make the device compact.

Figure 8:
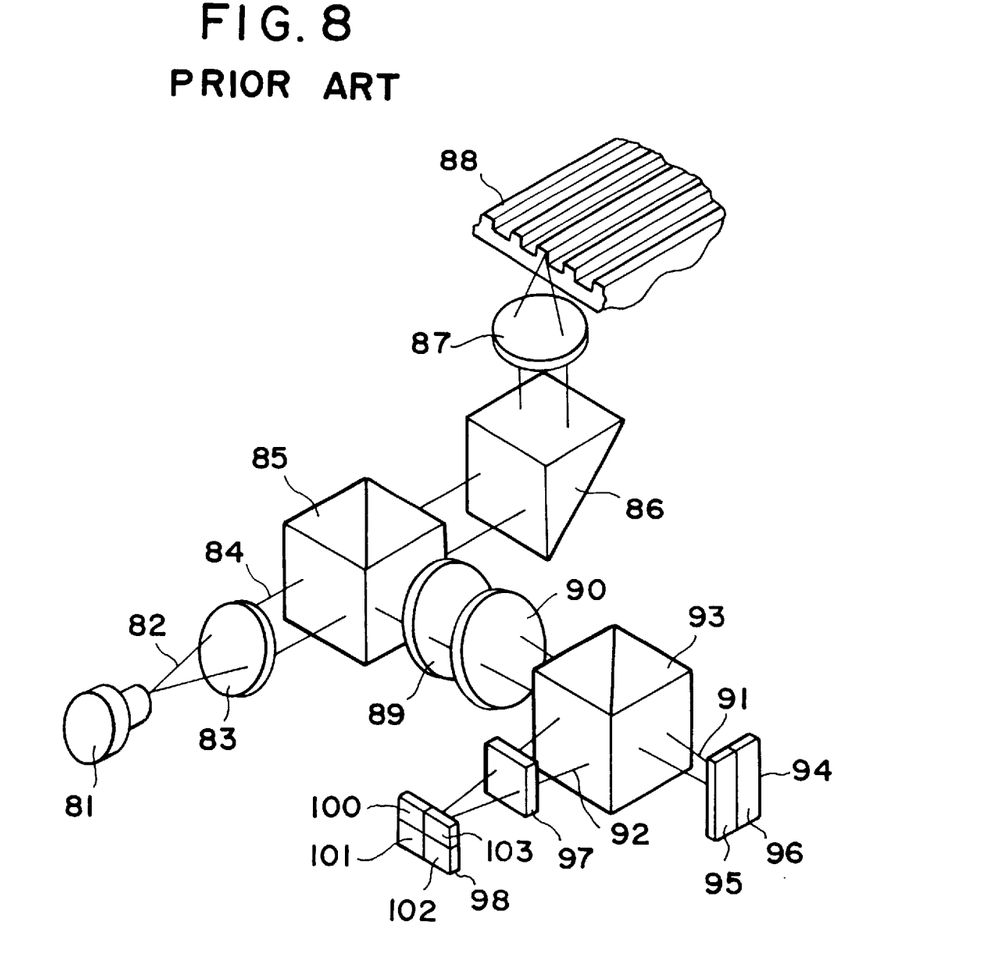
FIG. 8 is a perspective view showing arrangements of a conventional optical head device used in a magneto-optical disk device.

FIG. 8 shows a conventional optical head device for use in a magneto-optical disk drive. Emitted light 82 from a semiconductor laser 81 is converted to collimated light 84 by a collimating lens 83 and, after being transmitted through a beam splitter 85 and totally reflected at a total reflection prism 86 with the light path being bent 90 degrees, is converged on an optical disk surface 88 by a convergent lens 87. The reflected light returning from the optical disk follows the common path in reverse and is reflected at the beam splitter 85. The reflected light changes its polarization direction 90 degrees at a ½ wavelength plate 89, is converted to converging light by a lens 90 and is divided by a polarizing beam splitter 93 into the polarized transmission light 91 and the reflection light 92 the polarization directions of which are orthogonal to each other. The transmission light 91 is incident on a half-split photodetector 94, and a tracking error signal is obtained based on a differential signal from photodetector elements 95 and 96 by a push-pull method. On the other hand, the reflection light 92 forms an astigmatic wave surface due to a cylindrical lens 97, and a focusing error signal is obtained through a quarter-split photodetector 98 using an astigmatic method. That is, when the output voltages of photodetector elements 100, 101, 102 and 103 are assumed to be respectively $V_{(100)}$, $V_{(101)}$, $V_{(102)}$ and $V_{(103)}$, the focusing error signal can be obtained by $V_{(100)}+V_{(101)}-V_{(102)}-V_{(103)}$. The read-out signal is obtained as a differential signal based on intensity differences between the polarized light beams which are split by the polarization beam splitter and the polarization directions of which are orthogonal with each other. Thus, assuming that the output voltages of the photodetector elements 95 and 96 are respectively $V_{(95)}$ and $V_{(96)}$, the read-out signal will be $V_{(95)}+V_{(96)}-V_{(100)}-V_{(101)}-V_{(102)}-V_{(103)}$.

For the magneto-optical head device utilizing the polarizing hologram, reference is made to Japanese Patent Application Kokai Publication No. 3-29137 which has already been identified above and which discloses the arrangement as shown in FIG. 6. That arrangement employs the polarizing hologram formed by providing ion exchange on a lithium niobate crystal and this enables to reduce the optical system after the ½ wavelength plate 89 in FIG. 8 to three elements, namely, the polarizing hologram, lens and photodetectors.

However, the above conventional optical head device is still large in size, and a device in practical use is larger than about 40×40×30 mm and weighs heavy accordingly. This has been a barrier in enhancing high speed tracking access and scaling down of the optical disk device as a whole.

SUMMARY OF THE INVENTION

An object of the invention, therefore, is to overcome the problems existing in the prior art and to provide a birefringent diffraction grating polarizer in which it is possible to minimize the time for forming the grating layer and fabricating an optical head device which utilizes such polarizer, thereby enabling to further scale down the device.

According to one aspect of the invention, there is provided a birefringent diffraction grating polarizer comprising:

a crystal plate having optically anisotropic characteristics;

an ion exchange region and a dielectric film which constitute a diffraction grating and which are formed periodically on a main surface of the crystal plate; and a total reflection film formed on a surface of the diffraction grating.

In the above birefringent diffraction grating polarizer, a polarizing beam splitter layer may be formed on an entire surface opposite to the main surface of the crystal plate or on a partial region of the surface opposite According to another According to another aspect of the invention, there is also provided an optical head device comprising:

a light source;

a converging lens system for converging light beams emitted from the light source on a recording medium;

a quarter-wavelength plate for causing a polarized light beam returning from the recording medium to be orthogonal with respect to a polarized light beam emitted from the light source;

a hologram element for reflecting the light from the light source to the converging lens system and for reflectively diffracting the light returning from the recording medium; and a photodetector means for receiving the diffracted light, wherein the hologram element comprises a crystal plate having optically anisotropic characteristics, an ion exchange region and a dielectric film constituting a diffraction grating and being formed periodically on a main surface of the crystal plate, and a total reflection film formed on a surface of the diffraction grating.

The birefringent diffraction grating polarizer according to the first aspect of the invention (FIGS. 9–14B) is configured as a reflection type. In this configuration, since the light reciprocates between the grating layers, the necessary thicknesses of the proton exchange and the grating layer of the phase compensation film can be reduced to less than half as compared with the thicknesses of those of the conventional light transmission type. As already explained with reference to the prior art, the phase difference between the light that passes through the proton exchange region and the light that passes through the region without the proton exchange may be $\pi$ in the case of extraordinary light and be 0 in the case of ordinary light for the extraordinary light to be diffracted and the ordinary light to be reflected. The phase relationship in such instance can be expressed by the following equations:

$$(\Delta n_e \cdot 2T_p' + n_d \cdot 2T_d') \cdot 2\pi/\lambda = \pi$$

$$(\Delta n_o \cdot 2T_p' + n_d \cdot 2T_d') \cdot 2\pi/\lambda = \pi$$

From the above, $T_p'$ and $T_d'$ may be obtained as follows:

$$T_p' = \lambda/\{4 \cdot (\Delta n_e - \Delta n_o)\}$$

$$T_d' = -\Delta n_d \cdot T_p'.$$

When the thickness of the proton exchange region and the thickness of the dielectric phase compensation film are compared with those of the prior art transmission type explained above, their relationship may be expressed by the following equations:

$$T_p' = T_p/2$$

$$T_d' < T_d/2.$$

Where the light is incident obliquely on the grating, the optical path length becomes longer as compared with the case wherein the light is incident thereon perpendicularly, the proton region and the phase compensation film can be made still thinner.

In the polarizing hologram element according to the second aspect of the invention (FIGS. 15–17), since the polarizing beam splitter film is formed on the polarizing hologram element which is obliquely disposed for the incident light, the function of the beam splitter which was required in the conventional optical head is accommodated in the polarizing hologram element. As a result, the optical head employing the polarizing hologram element according to the invention does not need to use the beam splitter so that the optical head device according to the invention may basically comprise four elements, namely, a light source, the polarizing hologram element as described above, a convergent lens and a multi-split photodetector.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the accompanying drawings.

Figure 9:
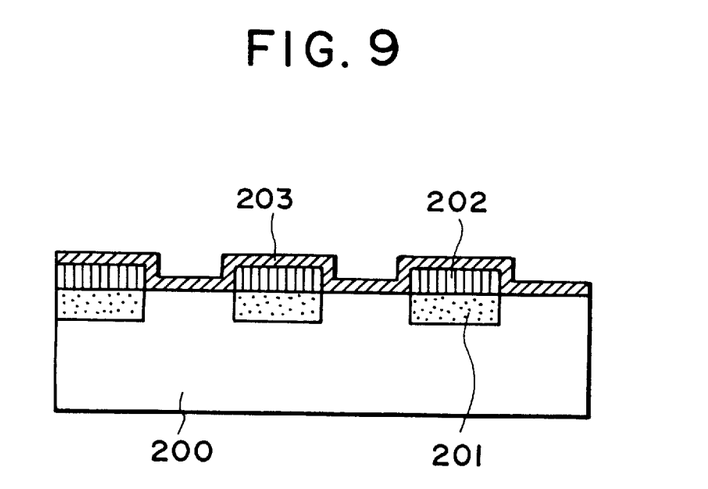
FIG. 9 is a diagrammatic sectional view of a birefringent diffractive grating polarizer of an embodiment according to the invention.

FIG. 9 shows in sectional view a birefringent diffraction grating polarizer of an embodiment according to the invention. The dielectric film used as a phase compensation film 202 has a refractive index of 2.2 which is approximately the same as that of a lithium niobate substrate 200. For the light having a wavelength of 0.78 μm, whereas the conventionally configured transmission type requires the phase compensation film to be about 800 nm thick and the proton exchange layer to be about 2.4 μm deep, it is sufficient for the polarizer of the reflection type according to the invention to function if the phase compensation film 202 is about 200 nm thick and the proton exchange region 201 is about 1.2 μm deep. The dielectric film may be formed of $Nb_2O_5TiO_2$ or $Ta_2O_5$. As the total reflection film 203, a metal film or a dielectric multilayer reflection film may be used.

Figure 10:
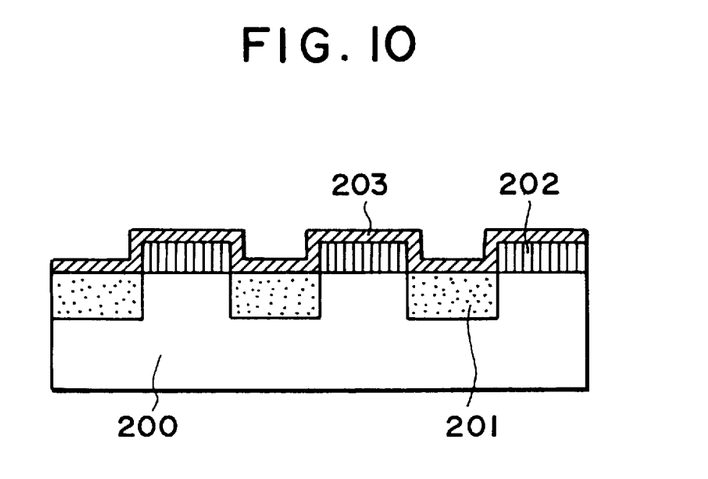
FIG. 10 is a diagrammatic sectional view of a birefringent diffractive grating polarizer of another embodiment according to the invention.

FIG. 10 shows in sectional view a birefringent diffraction grating polarizer of another embodiment according to the invention. This embodiment is similar to the embodiment shown in FIG. 9 but is different in that the proton exchange regions 201 and the dielectric phase compensation films 202 are alternately arranged.

Figure 11A:
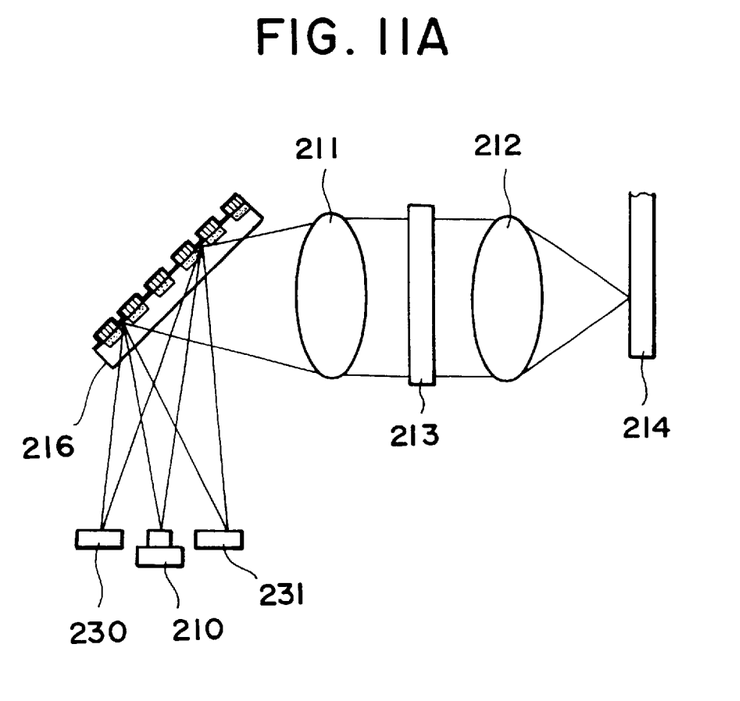
FIG. 11A is a diagram showing arrangements of an optical head device of a first embodiment according to the invention.
Figure 11B:
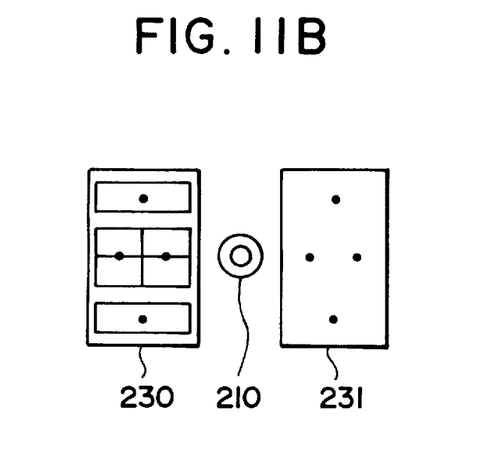
Fig. 11B is a diagram showing a state of diffracted light beams at various detection points in the optical head device of the first embodiment according to the invention.

FIG. 11A shows in a schematically exploded view the optical head device of the first embodiment according to the invention, that is, the optical head device for use in a video disk, a write once read many type optical disk and a rewritable type phase-change optical disk. The hologram element 216 is configured such that the back surface thereof constitutes the birefringent diffraction grating polarizer of a reflection type as explained above, and the grating pattern therein takes the same pattern as in the prior art for the focusing and tracking error signal detection as shown in FIGS. 2 and 3. The light from the semiconductor laser 210 of the light source is incident on the hologram element 216 where the light is in such polarization state that it is reflected without being diffracted at the grating layer therein. The reflected beams are collimated by a collimating lens 211 and are converged on an optical disk 214 after passing through a ¼ wavelength plate 213 and an objective lens 212. The beams reflected at the optical disk 214 return through the common path and are again incident on the hologram element 216. At this time, the polarization direction of the reflected light is rotated 90 degrees from that of the original light after passing forwardly and rearwardly through the ¼ wavelength plate 213, so that the light is diffracted at the hologram element 216 and the diffracted beams are received by a first photodetector 230 and a second photodetector 231, respectively. FIG. 11B shows the state of the diffracted beams at various detection points. The focusing and tracking error signals and the recording signals are detected in the same way as in the prior art explained above.

Figure 12A:
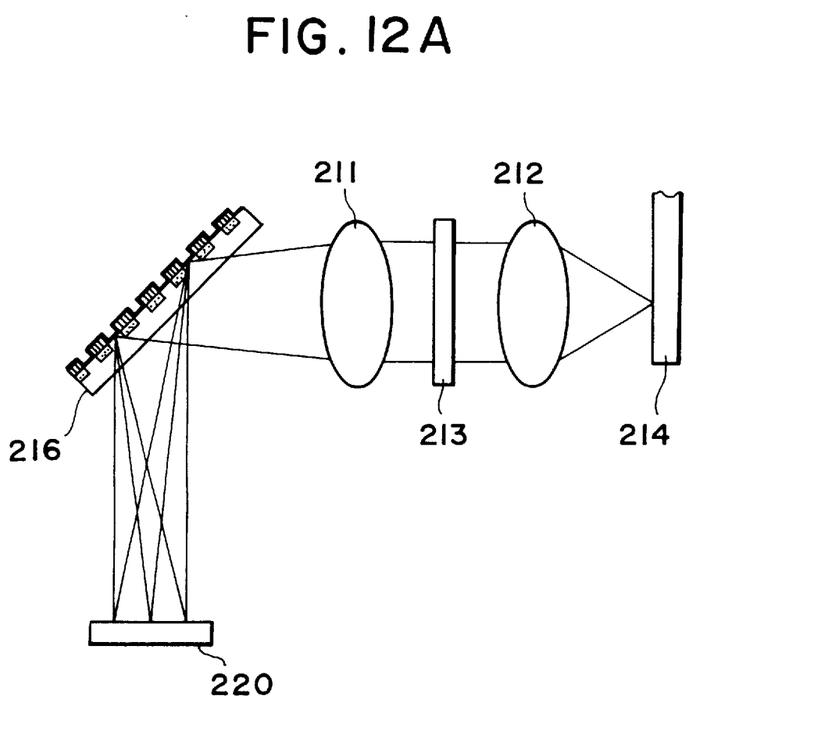
FIG. 12A is a diagram showing arrangements of an optical head device of a second embodiment according to the invention.
Figure 12B:
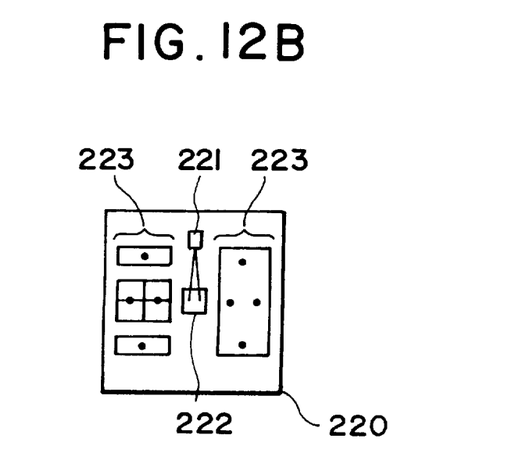
FIG. 12B is a diagram showing a state of diffracted light beams at various detection points in the optical head device of the second embodiment according to the invention.

FIG. 12A shows in a schematically exploded view an arrangement of the second embodiment according to the invention. In this embodiment, the semiconductor laser 210 and the photodetectors 230 and 231 in the first embodiment are unitarily accommodated in a module 220. FIG. 12B shows such module 220. The beams emitted from the semiconductor laser chip 221 are reflected at the mirror 222 and proceed to the hologram element 216. Also, the beams which return from the hologram element 216 are received by a group of photodetector elements 223, and the focusing and tracking error signals and the recording signals are detected in the same way as already explained.

Figure 13A:
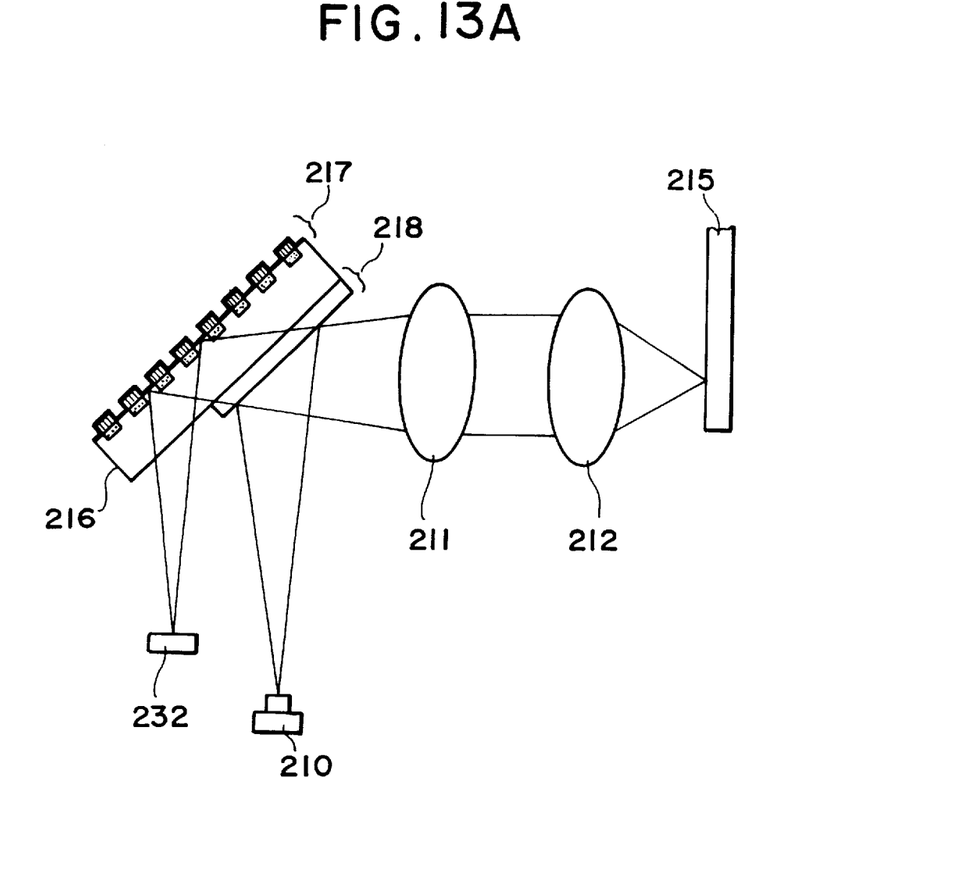
FIG. 13A is a diagram showing arrangements of an optical head device of a third embodiment according to the invention.
Figure 13B:
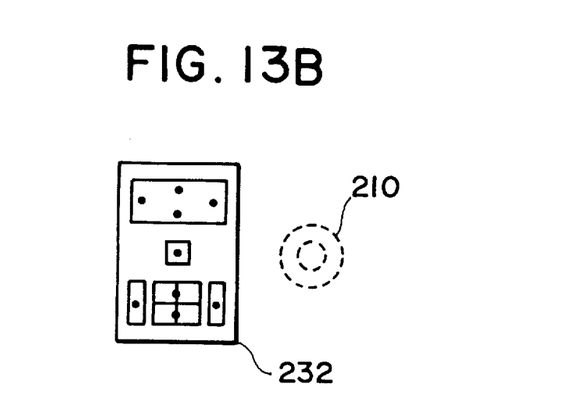
FIG. 13B is a diagram showing a state of diffracted light beams at various detection points in the optical head device of the third embodiment according to the invention.

FIG. 13A shows in a schematically exploded view an optical head device of the third embodiment according to the invention, which is for use in the magneto-optical disk. In the hologram element 216, the reflection grating layer 217 is formed at a back surface thereof and a polarizing beam splitter layer 218 is formed at a partial region of a front surface thereof. The reflection grating layer 217 is configured as the reflection type birefringent diffraction grating polarizer as already described, and the grating pattern takes the pattern as in the prior art shown in FIG. 2 or FIG. 3 for detecting focusing and tracking error signals. The polarizing beam splitter layer 218 at the front surface has polarization characteristics which allow most of predetermined polarized beams to be transmitted and cause the polarized beams orthogonal to such predetermined beams to be transmitted and reflected at a predetermined intensity ratio. This can be realized by forming a dielectric multi-layer film at the front surface or by cementing to the front surface a polarizing beam splitting substrate having the above characteristics. The light from the semiconductor laser 210 of the light source is incident on the polarizing beam splitter layer 218 on the hologram element 216 with the above-mentioned polarization state in which the polarized light beams are partly reflected. The reflected beams are collimated by a collimating lens 211 and are converged on a magneto-optical disk 215 after passing through an objective lens 212. The beams reflected at the magneto-optical disk 215 return through the common path in reverse and are incident again on the hologram element 216. The polarizing beam splitter layer 218 has polarization characteristics which allow such beams out of the returning beams as having the original polarization state to be partly transmitted, and cause the beams polarized orthogonal thereto, that is, slight amounts of polarized light occurring by Kerr effect at the reflection on the magneto-optical disk 215, to be mostly transmitted. The light having been transmitted through the polarizing beam splitter layer 218 is diffracted and-reflected by the reflecting grating layer 217 at the back surface and the diffracted and the reflected light are received by the photodetector 232. FIG. 13B shows a state of the diffracted light at the photodetector 232. The focusing and tracking error signals are detected from the +1 order diffracted light in the same way as explained with reference to the prior art. Also, as explained for the prior art, by setting an appropriate angle for the polarization direction of the above returning light with respect to the crystal optical axis of the hologram element 216, the recording signal can be detected from a difference between 0 order diffracted light and −1 order diffracted light, or between 0 order diffracted light and ±1 order diffracted light. Also, if it is arranged that higher order diffracted light be received, it is possible to increase the intensity of the recording signal.

Figure 14A:
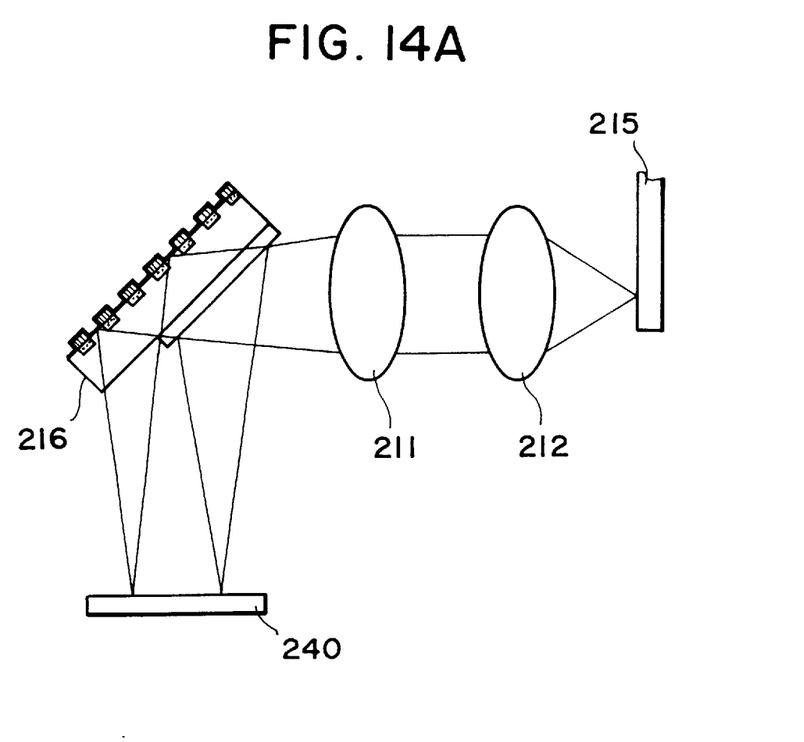
FIG. 14A is a diagram showing arrangements of an optical head device of a fourth embodiment according to the invention.
Figure 14B:
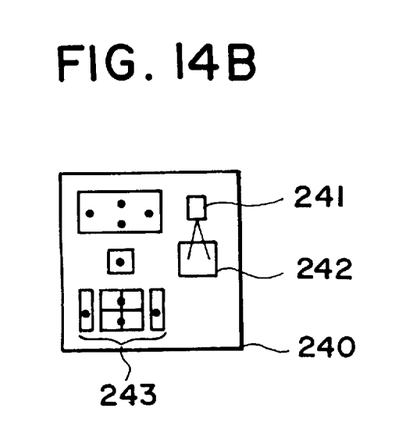
FIG. 14B is a diagram showing a state of diffracted light beams at various detection points in the optical head device of the fourth embodiment according to the invention.

FIG. 14A shows a schematically exploded view of an optical head device of the fourth embodiment according to the invention. The semiconductor laser and the photodetector in the above third embodiment are unitarily accommodated in a module 240. FIG. 14B diagrammatically shows the module 240. The light from the semiconductor chip 241 is reflected at the mirror 242 and advances to the hologram element 216. Also, the returning light from the hologram element is incident on a group of photodetector elements 243 and, as already described, the focusing and tracking signals and the recording signals are detected.

Since the birefringent diffraction grating polarizer according to the invention is configured in a reflection type, it is possible to reduce the fabrication time and to lower the cost of elements. Also, the optical device can be made compact since the optical head device according to the invention employs a reflection type birefringent diffraction grating polarizer and the optical head device can be made still more compact since the light source and the photodetectors are unitarily arranged in a module form.

Figure 15:
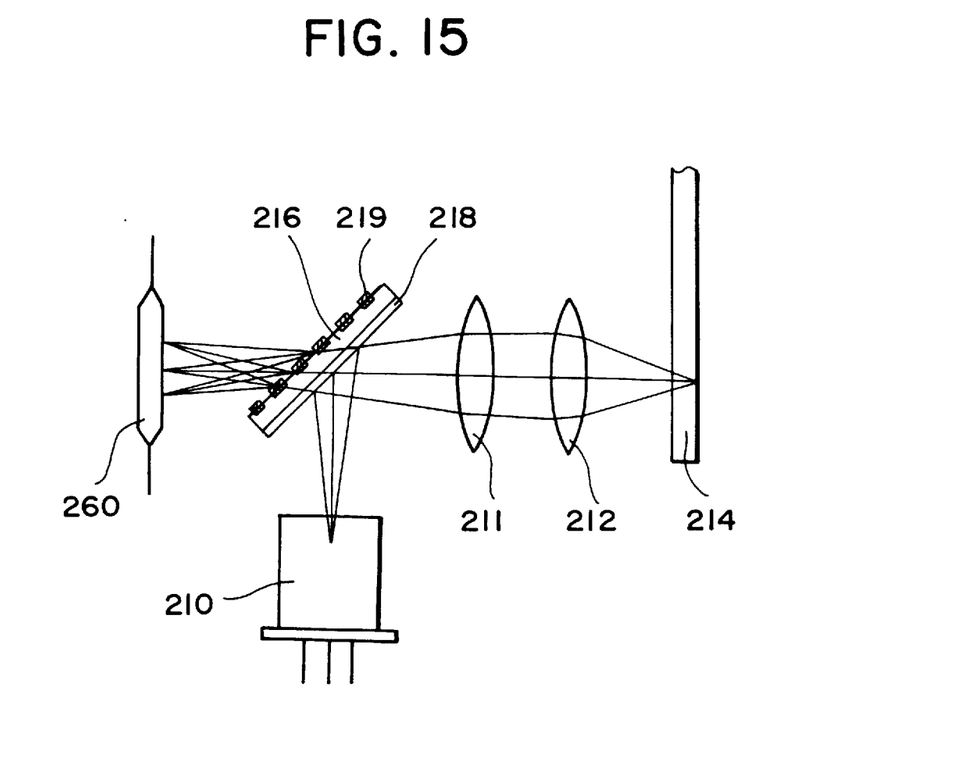
FIG. 15 is a diagram showing arrangements of an optical head device of a fifth embodiment according to the invention.

FIG. 15 shows in sectional view a basic configuration of the optical head device of the fifth embodiment according to the invention. The emitted light from the semiconductor laser 210 is reflected at a polarizing beam splitter film 218 on a surface of the polarizing hologram element 216, is converted to collimated light by a collimating lens 211 and is converged on an optical disk surface 214 by a convergent lens 212. The reflected light from the optical disk passes through the common path in reverse, is transmitted through the polarizing beam splitter film 218 on the surface of the polarizing hologram element 216, is diffracted by the polarizing hologram 219 and is received by a multi-split photodetector 260.

Where the emitted light from the semiconductor laser 210 is p-polarized, there occurs s-polarized light due to Kerr effect by reflection on the optical disk. The s-polarized light corresponds to the signal light so that, for enhancing the S/N ratio in reading, it is important for the s-polarized light to be transmitted as much as possible at the polarizing beam splitter film and be lead to the multi-split photodetector 260. Thus, when the emitted light from the semiconductor laser is to be p-polarized, the polarizing beam splitter film is so designed that the reflectivity of p-polarized light is 50%, the transmissivity of p-polarized light is about 50% and the transmissivity of s-polarized light becomes 100%. Where the emitted light from the semiconductor laser is to be s-polarized, the above is inverted. The polarizing hologram exhibits different diffraction effects depending on the polarization of incident light, and the +1 order diffracted light, the −1 order diffracted light and the 0 order diffracted light are detected by the multi-split photodetector 260 and the read-out signal is obtained from a difference between the sum of the received light intensities of +1 order diffracted light and −1 order diffracted light and the received light intensity of the 0 order diffracted light. Also, the focusing error signal and the tracking error signal are obtained by means of the multi-split photodetector receiving multi-split diffracted light from the polarizing hologram.

In this embodiment, the polarizing hologram element 216 is disposed between the semiconductor laser 210 and the collimating lens 211. It is also possible to arrange for the collimating lens 211 to be disposed between the semiconductor laser 210 and the polarizing hologram element 216. In this case, it is necessary that an appropriate lens be disposed between the polarizing hologram element 216 and the multi-split photodetector 260. Also, this embodiment employs the collimating lens 211 and the convergent lens 212, but it is possible to use a finite type objective lens which accommodates the collimating lens and the convergent lens as one unit. In this case, the polarizing hologram element 216 is disposed between the semiconductor laser 210 and the finite type objective lens.

Means to detect read-out signals and error signals and polarizing hologram means are disclosed in Japanese Patent application Kokai Publication No. 3-29137, the disclosure thereof being referred to herein for explaining the polarizing hologram element according to the present invention.

Figure 16:
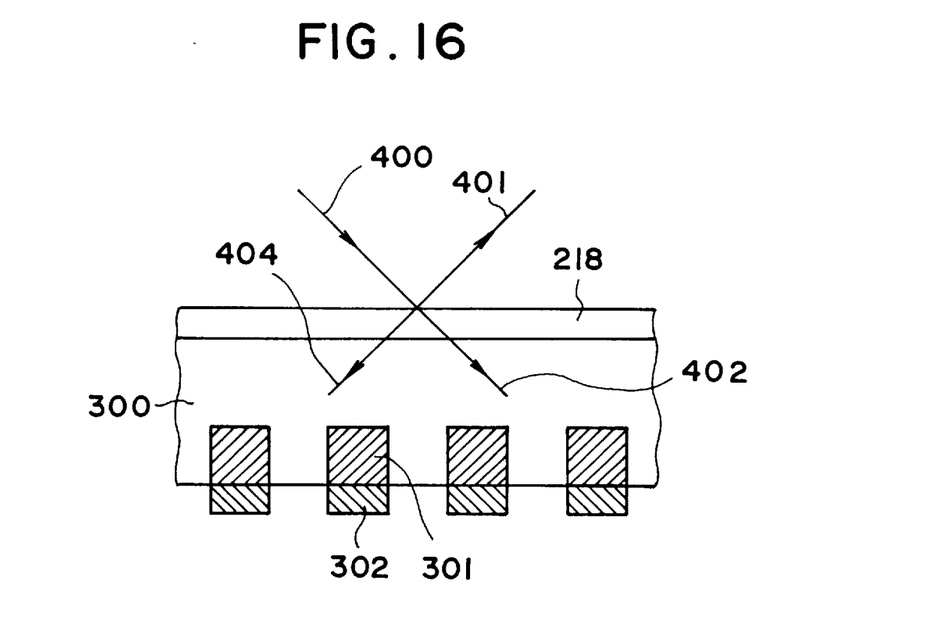
FIG. 16 is a diagram showing a polarizing hologram element according to the invention.

FIG. 16 shows in partial cross-section the polarizing hologram element according to the invention. Where the lithium niobate substrate 300 of X-plate or Y-plate is provided with, for example, a proton ion exchange region 301 with benzoic acid, an index of refraction with respect to extraordinary light increases about 0.13 and that with respect to ordinary light decreases about 0.04. In this case, by providing such means as a phase compensation film 302 for canceling the phase difference to occur between the ordinary light passing through the ion exchange region 301 and that passing through the non-exchange region, the changes in the indices of refraction caused by the ion exchange can be made as if such changes are taking place only in the extraordinary light.

Thus, if the configuration is such that, as shown in FIG. 16, the lithium niobate substrate 300 is provided with the hologram formed by the periodic exchange region 301 and non-exchange region with the phase compensation film 302 attached to the ion exchange region 301, the ordinary light is not subjected to a refractive index difference and the extraordinary light is subjected to the refractive index difference, so that it is possible to realize the polarizing hologram that functions only with the extraordinary light. In this case, if the phase difference between the extraordinary light through the exchange region and that through the non-exchange region is made π, the extraordinary light is completely diffracted whereby the transmissivity of the extraordinary light can be made 0% and the transmissivity of the ordinary light can be made 100%.

In the optical head device according to the invention, it is arranged that the main polarizing direction of the reflected light from the magneto-optical disk surface 214 be oriented about 45 degrees with respect to the Z-axis of the lithium niobate substrate 300 of the polarizing hologram and, in this way, it is possible to divide the extraordinary light component and the ordinary light component of the reflected light from the optical disk into the diffracted light and the transmitted light, respectively. The magneto-optical read-out signals are obtained by differential detection through differential signals based on light intensities of the diffracted light and the transmitted light.

In the polarizing hologram element shown in FIG. 16, not only the polarizing hologram which functions as explained above, but also the polarizing beam splitter film 218 is provided on a surface of that portion of the substrate at which there is no polarizing hologram. Here, the incident light 400 comes from the semiconductor laser and a part of this light advances to the optical disk as the reflected light 401. The transmitted light 402 is lost. In order to enhance the reading S/N ratio as already explained, the polarizing beam splitter film 218 in the case where the light from the semiconductor laser is of the p-polarization is designed such that the reflectivity of p-polarized light becomes 50%, the transmissivity of p-polarized light becomes 50% and the transmissivity of s-polarized light becomes 100%. In the case where the light from the semiconductor laser is of the s-polarization, the design will be in reverse. The light reflected by the optical disk returns through the common path and is incident on the polarizing beam splitter film 218 whereby a portion of the light advances to the polarizing hologram as return transmitted light 404 for being used for signal detection. The reflected light produced in the direction of the incident light 400 is lost.

The polarizing beam splitter film will be the same when formed on the polarizing hologram surface.

Figure 17:
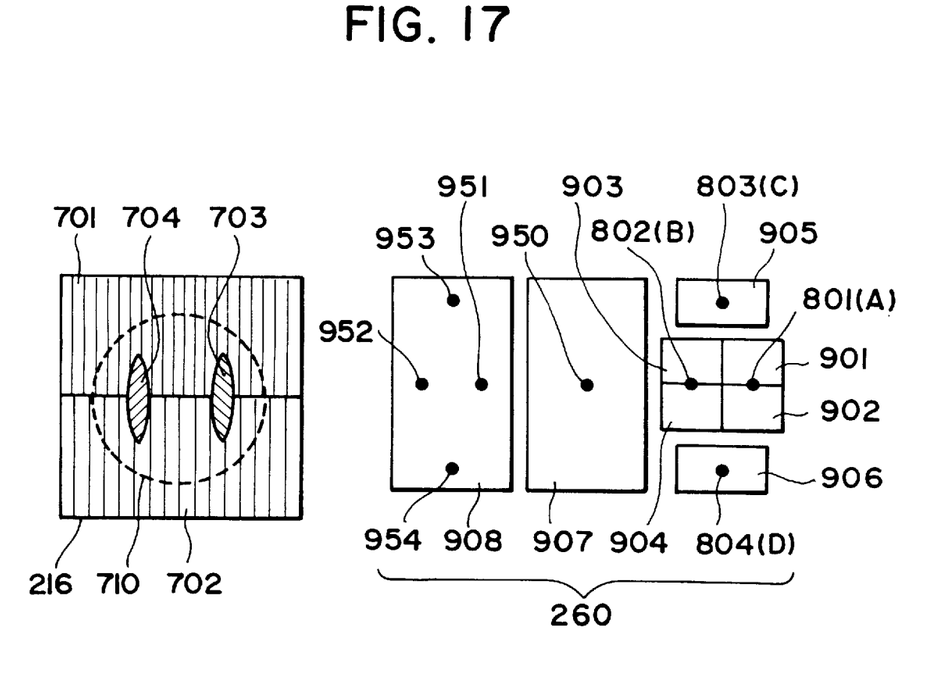
FIG. 17 is a diagram showing relationship between the polarizing hologram element and the multi-split photodetector.

Error signal detection is explained with reference to FIG. 17 which shows the correspondence relationship between the polarizing hologram element 216 and the multi-split photodetector 260 in the optical head device according to the invention. Since the focusing error detection and the tracking error detection are performed based on the +1 order diffracted light, the detector used is one in which the polarizing hologram element 216 is divided into four regions and the light receiving surface as the multi-split photodetector 260 is divided into eight regions. The hologram is formed on the first hologram section 701 in such a way that, when the light spot 710 is correctly formed on the optical disk, the light incident on the first hologram section 701 is diffracted and converged at point 801(A) on the dividing line between the first photodetector 901 and the second photodetector 902.

Similarly, the grating is provided in such a way that, at the second hologram section 702, third hologram section 703 and fourth hologram section 704, the light beams incident on the respective regions are diffracted and converged respectively at point 802(B) on the dividing line between the third photodetector element 903 and the fourth photodetector element 904, point 803(C) and point 804(D). The focusing error signal is obtained, using a double-knife-edge method, as a difference of diagonal sum signals in the outputs from the first photodetector element 901, the second photodetector element 902, the third photodetector element 903 and the fourth photodetector element 904. The tracking error signal is detected, using a push-pull method, as a difference in the outputs from the fifth photodetector element 905 and the sixth photodetector element 906. The reading data signal is obtained as a difference in the outputs from the seventh photodetector element 907 and the eighth photodetector element 908. Numeral 950 denotes the 0 order diffracted light and numerals 951 through 954 denote the −1 order diffracted light.

Thus, the fifth embodiment of the invention described provides an optical head device for use in magneto-optical disks which is compact, light in weight and low priced, and a polarizing hologram element for use in head devices which is also compact, light in weight and low priced.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An optical head device comprising:
   a light source;
   a converging means for converging light beams emitted from said light source on a recording medium, said converging means converting the emitted light beams into a convergent light;
   a polarizing hologram element obliquely disposed between said light source and said converging means, for reflecting a part of the light beams emitted from said light source to be incident on said converging means and for spatially dividing and diffracting a part of reflected light coming from said recording medium via said converging means, said polarizing hologram element having on its main surface a plurality of divided hologram regions and having a polarizing beam splitter film on a surface opposite to said main surface; and
   a photodetector means having a plurality of light receiving sections each of which receives the diffracted light from said polarizing hologram element.

2. The optical head device according to claim 1, wherein said polarizing hologram element comprises a crystal plate having optically anisotropic characteristics, an ion exchange region and a dielectric film constituting a diffraction grating and being formed periodically on a main surface of said crystal plate.

3. The optical head device according to claim 2, wherein said crystal plate has a crystal axis orientation which is rotated by 45° with respect to the p-polarization axis.

4. An optical head device comprising:
   a light source;
   a converging lens system for converging light beams emitted from said light source on a recording medium;
   a quarter-wavelength plate for causing the polarization state of light returning from said recording medium to be orthogonal with respect to the polarization state of light emitted from said light source;
   a hologram element for reflecting the light from said light source to said converging lens system and for reflectively diffracting the light returning from said recording medium; and
   a photodetector means for receiving said diffracted light,
   wherein said hologram element comprises a crystal plate having optically anisotropic characteristics, an ion exchange region and a dielectric film constituting a diffraction grating and being formed periodically on a main surface of said crystal plate, and a total reflection film formed on a surface of said diffraction grating.

5. An optical head device according to claim 4, in which said light source and said photodetector means are accommodated in an integrated module.

6. The optical head device according to claim 5, wherein a surface of said integrated module containing said light source and said photodetector means is substantially perpendicular to an optical axis of said light source.

7. An optical head device according to claim 4, in which said converging lens system includes a collimating lens and an objective lens with said quarter-wavelength plate being arranged therebetween.

8. An optical head device comprising:
   a light source;
   a converging lens system for converging light beams emitted from said light source on a recording medium;
   a hologram element for reflecting the light from said light source to said converging lens system and for reflectively diffracting the light returning from said recording medium; and
   a photodetector means for receiving said diffracted light,
   wherein said hologram element comprises a crystal plate having optically anisotropic characteristics, an ion exchange region and a dielectric film constituting a diffraction grating and being formed periodically on a main surface of said crystal plate, a total reflection film formed on a surface of said diffraction grating, and a polarizing beam splitter layer formed on a partial region of a surface opposite to said main surface of said crystal plate, and
   wherein said crystal plate has a crystal axis orientation which is rotated by 45° with respect to the p-polarization axis.

9. An optical head device according to claim 8, in which said light source and said photodetector means are accommodated in an integrated module.

10. The optical head device according to claim 9, wherein a surface of said integrated module containing said light source and said photodetector means is substantially perpendicular to an optical axis of said light source.

11. An optical head device according to claim 8, in which said converging lens system includes a collimating lens and an objective lens.

* * * * *

UNITED STATES PATENT AND TRADEMARK OFFICE
CERTIFICATE OF CORRECTION

PATENT NO. : 5,883,741
DATED : March 16, 1999
INVENTOR(S) : Yuzo ONO and Akitomo OBA It is certified that error appears in the above-identified patent and that said Letters Patent is hereby corrected as shown below:

Column 2, line 11, delete "$=\lambda$" and insert --$\pi$--.

Column 5, line 47, delete "$T_d' = -\Delta n_d \cdot T_p'$" and insert -- $T_d' = \dfrac{\Delta n_o}{n_d} \cdot T_p'$ --.

Signed and Sealed this

Seventh Day of September, 1999

Q. TODD DICKINSON

Attest:

Attesting Officer

Acting Commissioner of Patents and Trademarks